(12) United States Patent
Abe et al.

(10) Patent No.: US 8,070,474 B2
(45) Date of Patent: Dec. 6, 2011

(54) LAMINATION SHAPING APPARATUS

(75) Inventors: Satoshi Abe, Moriguchi (JP); Yoshikazu Higashi, Moriyama (JP); Norio Yoshida, Kitakatsuragi-gun (JP); Isao Fuwa, Osaka (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 0 days.

(21) Appl. No.: 12/375,675

(22) PCT Filed: May 30, 2008

(86) PCT No.: PCT/JP2008/060048
§ 371 (c)(1),
(2), (4) Date: Feb. 20, 2009

(87) PCT Pub. No.: WO2008/146920
PCT Pub. Date: Dec. 4, 2008

(65) Prior Publication Data
US 2010/0006228 A1    Jan. 14, 2010

(30) Foreign Application Priority Data
May 30, 2007 (JP) ................. 2007-144014

(51) Int. Cl.
*B29C 67/04* (2006.01)
*B29C 35/08* (2006.01)
*B28B 1/16* (2006.01)

(52) U.S. Cl. ............. 425/375; 425/174.4; 425/225; 264/308; 264/401; 264/497; 118/256

(58) Field of Classification Search ........... 425/174.4, 425/375, 215, 225; 264/113, 308, 401, 497; 118/56, 256
See application file for complete search history.

(56) References Cited

U.S. PATENT DOCUMENTS
5,204,055 A  4/1993 Sachs et al.
5,340,656 A  8/1994 Sachs et al.
(Continued)

FOREIGN PATENT DOCUMENTS
| EP | 0 644 809 B1 | 7/2001 |
| EP | 1 872 928 A1 | 1/2008 |
| JP | 2002-038201 A | 2/2002 |
| JP | 2002-115004 A | 4/2002 |
| JP | 2006-124732 A | 5/2006 |
| WO | WO 2005/115663 | * 12/2005 |

OTHER PUBLICATIONS

International Search Report for the Application No. PCT/JP2008/060048 mailed Aug. 19, 2008. German Examination Report for the Application File Reference No. 11 2008 000 027.1-44 from German Patent and Trademark Office dated Apr. 7, 2009.

Primary Examiner — Maria Veronica Ewald
(74) Attorney, Agent, or Firm — Cheng Law Group, PLLC

(57) ABSTRACT

A lamination shaping apparatus has a powder layer preparing means and an optical unit which irradiates a light beam to an intended portion of a powder layer so as to sinter or melt for solidifying the portion into a cured layer. Preparation of the powder layer and curing of the cured layer are repeated to fabricate a three-dimensional object in which a plurality of the cured layers are laminated and integrated. The apparatus includes a fixed base carrying thereon the powder layer and the cured layer, an elevator frame surrounding a periphery of the fixed base, and driving means for driving the elevator frame to move vertically. The powder layer is formed within a space above the base and surrounded by an interior surface of the elevator fame such that the powder layer (cured layer) can be stacked on the base with the base being kept at a fixed position, thereby facilitating to fabricate a precisely shaped object.

46 Claims, 22 Drawing Sheets

U.S. PATENT DOCUMENTS

| | | |
|---|---|---|
| 5,387,380 A | 2/1995 | Cima et al. |
| 5,667,820 A * | 9/1997 | Heller et al. .................. 425/135 |
| 5,807,437 A | 9/1998 | Sachs et al. |
| 6,036,777 A | 3/2000 | Sachs |
| 6,132,667 A * | 10/2000 | Beers et al. ................... 264/401 |
| 6,146,567 A | 11/2000 | Sachs et al. |
| 7,074,029 B2 * | 7/2006 | Stockwell et al. ......... 425/174.4 |
| 2006/0192322 A1 * | 8/2006 | Abe et al. ...................... 264/497 |
| 2007/0252309 A1 * | 11/2007 | Higashi et al. ................ 264/408 |
| 2008/0001331 A1 * | 1/2008 | Ederer .......................... 264/460 |

\* cited by examiner (a)

(b)

(c)

(a)

(b)

(a)

(b)

(a)

(b)

(a)

(b)

LAMINATION SHAPING APPARATUS

TECHNICAL FIELD

The present invention relates to a lamination shaping apparatus for fabricating a three-dimensional lamination object with the use of a light beam irradiated to sinter or melt powder material for solidification thereof.

BACKGROUND ART

There is already proposed a process of fabricating a lamination object known as a selective powder sintering lamination. The process includes a step of forming a powder layer of inorganic or organic powder, and a step of irradiating a light beam to an intended portion of the powder layer to sinter or melt for solidifying it into a cured layer, these steps being repeated to fabricate the object in which a plurality of the cured layer are laminated and integrated. Japanese patent publication JP2002-115004 A (patent document 1) discloses, in addition to the above, to provide a step of grinding a surface of a precursor of the object between the repeated curing steps of forming the curing layers in order to give a smooth finish to the object of various shape at a low cost.

However, the above prior art sees a drawback as to accuracy of the laminated object. That is, in order to successively forming the thin powder layers, as shown in FIG. 22, a shaping section is composed of a shaping stage 61, an elevation mechanism 62 for elevating the shaping stage 61, and a shaping frame 63 surrounding the shaping stage 61. Further, a powder supplying section is composed of a tank 65, an elevation mechanism 66 and an elevation table 67 for lifting the powder material in the tank, a supplier blade 68 for feeding the powder material from the top of the tank onto the shaping stage 61 and smoothening the powder material.

With this arrangement, the powder layer on the shaping stage 61 is sintered or melted at a predetermined portion to be solidified into the cured layer, and a subsequent powder layer is formed by lowering the shaping stage 61 and lifting the elevation table 67 by one step followed by moving the supplier blade 68. However, since the shaping stage 61 carrying thereon the object is made movable, the precursor of the object is likely to suffer from a minute positional fluctuation during the course of irradiating the light beam to sinter or melt for solidification, or using a milling machine for grinding, which makes it difficult to precisely fabricate the object having the order of micrometers.

Further, the elevation mechanism 62 and 66 for elevating the shaping stage 61 and the elevation table 67 have to be disposed below the stage 61 and table 67. With this result, the shaping section has a total height of H more than doubled an elevation range H1 of the shaping stage 61 (and elevation table 67), making it difficult to reduce the total height of the apparatus. In the figure, H2 indicates a driving range of the elevation means 62(66).

[Patent document 1] JP 2002-115004 A

DISCLOSURE OF THE INVENTION

Problem to be Solved by the Invention

The present invention has been achieved in view of the above drawbacks and has a problem of providing a lamination shaping apparatus which is capable of fabricating a highly precise lamination object, yet with a compact arrangement.

Means for Solving the Problem

The lamination shaping apparatus in accordance with the present invention is characterized in the first instance to include a powder layer preparing means configured to prepare a powder layer of inorganic or organic powder material, and an optical unit configured to irradiate a light beam to an intended portion of the powder layer to sinter or melt for solidifying the portion into a cured layer such that the preparation of the powder layer and the forming of the cured layer are repeated to fabricate a three-dimensional object in which a plurality of the cured layers are laminated and integrated. The apparatus further includes a fixed base carrying thereon the powder layer and the cured layer, an elevator frame configured to surround a periphery of the fixed base and to be vertically movable relative to the fixed base, thereby defining thereabove a space which is surrounded by an interior surface of the elevator frame to prepare the powder layer; and an elevator driving means which drives the elevator frame to move vertically. The lamination shaping apparatus in accordance with the present invention is characterized in the second instance to include a powder layer preparing means configured to prepare a powder layer of inorganic or organic powder material, an optical unit configured to irradiate a light beam to an intended portion of the powder layer in order to sinter or melt for solidifying the portion into a cured layer such that the preparation of the powder layer and the forming of the cured layer are repeated to fabricate a three-dimensional object in which a plurality of the cured layers are laminated and integrated, and a milling unit provided to grind a surface of a precursor of the three-dimensional object being fabricated, wherein the apparatus further includes a fixed base carrying thereon the powder layer and the cured layer, an elevator frame configured to surround a periphery of the fixed base and to be vertically movable relative to the fixed base, and an elevator driving means which drives the elevator frame to move vertically. The milling unit being in the form of a numerical control machine having a table which is controllable at least in three axes and is fixed to the base such that the powder layer is prepared within a space disposed above the base and surrounded by an interior surface of the elevator flame.

Accordingly, the powder layer (cured layer) can be stacked on the base with the base kept stationary, enabling to fabricate a highly precise object.

When the powder layer preparing means is configured to include a slide plate which is slidable on a top face of the elevator frame and has a powder supply port for feeding the powder into the space formed on the base and surrounded by the elevator frame, it is easily to be made into a compact structure.

When the powder supply port is dimensioned to have a width which is perpendicular to a sliding direction of said slide plate, and which is greater than a corresponding width of the base, the powder can be supplied uniformly.

The slide plate may be preferred to include a member for enhancing a bulk density of said powder in order to increase post-sintered or melt-solidified density.

The slide plate may be provided with a member for smoothening the surface of the powder layer so as to give advantages of preventing wear-deterioration, supplying the powder stably, and reducing surface roughness of the cured layer.

Further, the apparatus is preferred to include a mask frame which is disposed on the elevator frame to have an open bottom and a window in its top opening for passing therethrough the light beam, and an atmospheric gas supplying means for supplying an atmospheric gas within the mask frame. With this arrangement, it is possible to restrain the amount of the atmospheric gas while avoiding oxidization of the cured layer.

The mask frame may be provided with a whirl flow forming means for supplying said atmospheric gas in the form of a whirl flow into within said mask frame, enabling to efficiently charging the atmospheric gas.

The apparatus may further include an oxygen concentration meter for measuring an oxygen concentration within an interior space of said mask frame. In this version, the atmospheric gas supplying means is configured to supply the atmospheric gas according to an output of said oxygen concentration meter in order to further restrain the amount of the atmospheric gas.

The apparatus may includes a piston which is configured to move vertically within the mask frame for supplying and exhausting the atmospheric gas, thereby making prompt supply and discharge of the atmospheric gas.

When the window is in the form of a f·θ lens, it is possible to make accurate sintering or melt-solidification.

The apparatus is preferred to include a cleaning means configured to clean the interior surface of said mask frame including the interior face of said window so as to remove dirt due to a fume generating at the sintering for successful sintering. The cleaning means may be composed of a cleaning member which is formed on the elevator frame to be vertically movable and rotatable within the mask frame.

Also, a plurality of the mask frames may be provided to be slidable on the top face of the elevator frame such that when one of the mask frames is positioned on the base, the other mask frame comes into a position where it is cleaned by the cleaning means. Whereby, it is possible to simultaneously make the sintering and cleaning for reducing an increase of a fabrication time due to the cleaning operation.

The optical unit may be disposed on the side of the mask frame.

The apparatus may include a mark target provided on the top face of the elevator frame for providing a marking thereon by the light beam from the optical unit, and a measuring unit configured to measure the marking on the mark target to obtain a compensation data for an irradiation spot intended by the light beam from the optical unit. This arrangement enables to enhance the accuracy of irradiating the light beam for sintering or melt-solidification.

When a power meter is disposed on the top face of the elevation frame so as to measure a power of the light beam from the optical unit, it is easy to make an accurate sintering or melt-solidification with a moderate power, and also to indicate a proper cleaning time when equipped with the cleaning means.

The lamination shaping apparatus of the present invention is preferred to include a mask frame which is disposed on the elevator frame to have an open bottom, and a window in its top opening for passing therethrough the light beam, an atmospheric gas supplying means for supplying an atmospheric gas within said mask frame, and a slide plate which is slidable on the top face of the elevation frame and is provided with the powder layer preparing means, wherein the mask frame is formed as a portion of the slide plate. With this arrangement, the sliding of the slide plate makes the preparation of the powder layer as well as the sintering or melt-solidification under an inert atmospheric condition for efficient fabrication of the lamination object.

Still further, the elevation frame may be configured to surround an outer periphery of each of the plural bases and to be vertically movable relative to each of the bases. In this version, a slide plate is provided to be slidable on the top face of the elevation fame, while the powder layer preparing means is provided on the slide plate to prepare the powder layer on or above the plural bases selectively by the sliding movement of the slide plate. With this arrangement, the vertical movement of the single elevation frame is cooperative with the sliding movement of the slide plate to prepare the powder layers respectively on the plural bases.

The slide plate may be formed with a milling opening for passing therethrough a tool of the milling unit, such that the sliding movement of the slide plate can alone make a switching among the powder supply, the sintering or melt-solidification, and the grinding.

When the slide plate is provided with a suction unit for sucking uncured powder on the base for removal, it is easy to prevent the uncured powder from hindering the grinding and lowering the grinding accuracy.

When the slide plate is configured to rotate in a sliding relation with the top face of the elevation frame, the apparatus can be made compact even in the presence of various components incorporated in the slide plate.

When the optical unit is disposed to have a variable height position relative to a plane irradiated by the light beam, the irradiation of the light bean can be made in well conformity with the shaping rate or accuracy.

EFFECT OF THE INVENTION

The present invention enables to stack the powder layers (cured layers) on the base while keeping the base stationary, thus eliminating a factor of degrading the accuracy of the object being formed on the base and therefore assuring easy fabrication of highly precise lamination object. In a version in which the milling unit is employed to grind the surface of a precursor of the laminated object between the repeated steps of preparing the powder layer and the curing it into the cured layer, it is possible to avoid possible fluctuation of the laminated object at the time of grinding, thereby also assuring easy fabrication of highly precise lamination object.

EXPLANATION OF THE REFERENCE NUMERALS

Figure 1:
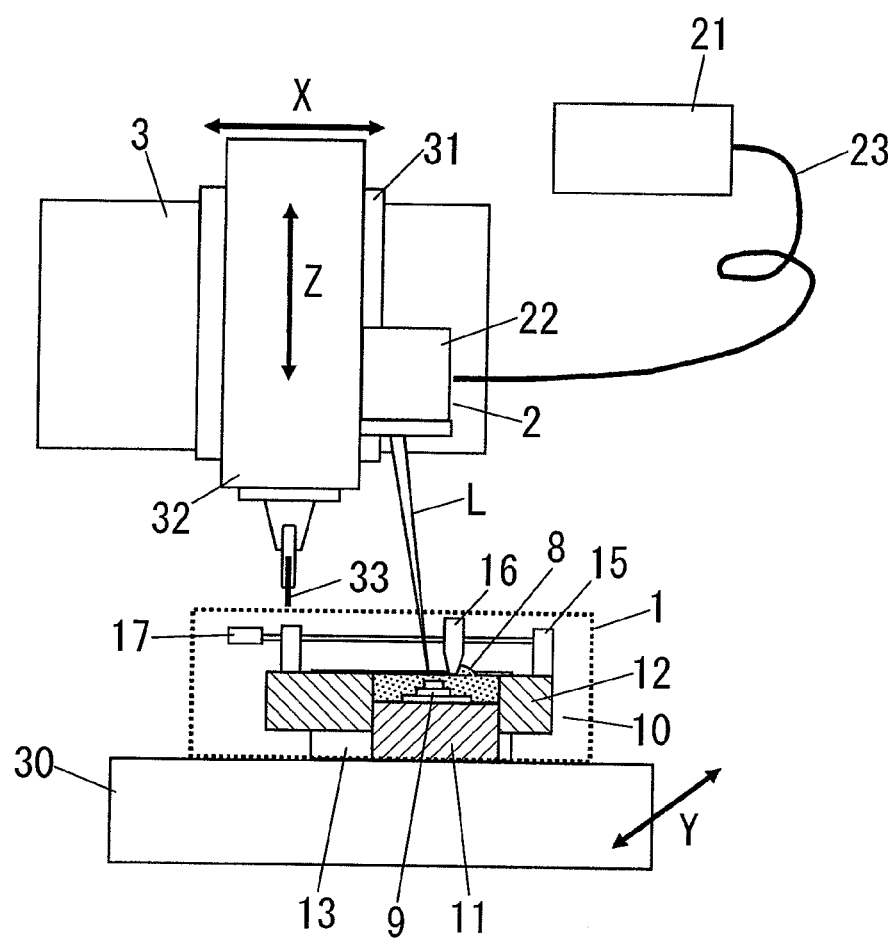
FIG. 1 is a schematic section illustrating an embodiment of the present invention.

1: shaping unit
2: optical unit
3: milling unit
8: powder
9: cured layer
10: shaping section
11: base
12: elevator frame
15: powder supply section
L: light beam

BEST MODE FOR CARRYING OUT THE INVENTION

The present invention is now explained with reference to the attached drawings. FIG. 1 illustrates a lamination shaping apparatus which includes a shaping unit 1 composed of a shaping section 10 and a powder supply section 15 disposed on the shaping section 10, an optical unit 2 irradiating a light beam L to the shaping section 10, and a milling unit 3 for grinding.

The milling unit 3 is a numerically controlled machine tool having a table (machining table) 30 and a headstock 31 controllable with respect to at least 3-axis. The headstock 31 has a spindle head 32 equipped with an end mill 33 for grinding, while the shaping unit 1 is disposed on the table 30 of the milling unit 3. A base 11 is fixed to the table 30 to form thereon a lamination object. The optical unit 2 is attached to the headstock 31. In the illustrated embodiment, the spindle head 32 is movable along X-axis and Z-axis, while the table 30 is movable along Y-axis.

The shaping section 10 of the shaping unit 1 is provided to form the lamination object on the base 11 fixed to the table 30, as explained in the above, and is provided with an elevator frame 12 which surrounds the periphery of the base 11 and is driven to move up and down by an elevator driving means in the form of a linear driving mechanism. The elevator frame 12 has a sufficient thickness at a portion around the base 11 such that a space of sufficient height is formed on the base within the confined of the elevator frame when the elevator frame 12 is raised relative to the base 11.

The powder supply section 15 is composed of a powder supplier (not shown) for supplying the powder on to the elevator frame 12, a supplier blade 16 disposed above the top face of the elevator frame 12, and a driving section 17 for horizontally driving the supplier blade 16.

Although not limited to a particular kind, the powder material 8 may be inorganic (metal or ceramic) powder or organic (plastic) powder that can be solidified into a cured layer by exposure to the light beam irradiated from the optical unit 2. In the illustrated example, an iron powder having an average particle size of 20 μm is utilized as the powder material.

The milling unit 3 has an end-mill 33 of a numerical controlled machining tool, especially a cutting tool, as a replaceable machining center. The end-mill 33 is chiefly selected as a ball end-mill with double carbide blades, and may be selected from a square end-mill, radius end-mill, or drill in accordance with to a particular shape or purpose.

The optical unit 2, which irradiates the light beam L for sintering the powder 8, includes a light source 21 composed of a laser oscillator, a collecting lens, and a scan mechanism 22 composed of a galvanometer mirror for deflecting the light beam L to direct it to the intended points or portions. In the illustrated embodiment, the scan mechanism 22 has its portion fixed to a side of the spindle head 32 with the scan mechanism 22 being connected to the light source 21 by way of an optical fiber 23. The light source 21 is realized by a carbon dioxide gas laser (500 W output power) or Nd:YAG laser (500 W output power) when the iron powder is utilized.

Figure 2:
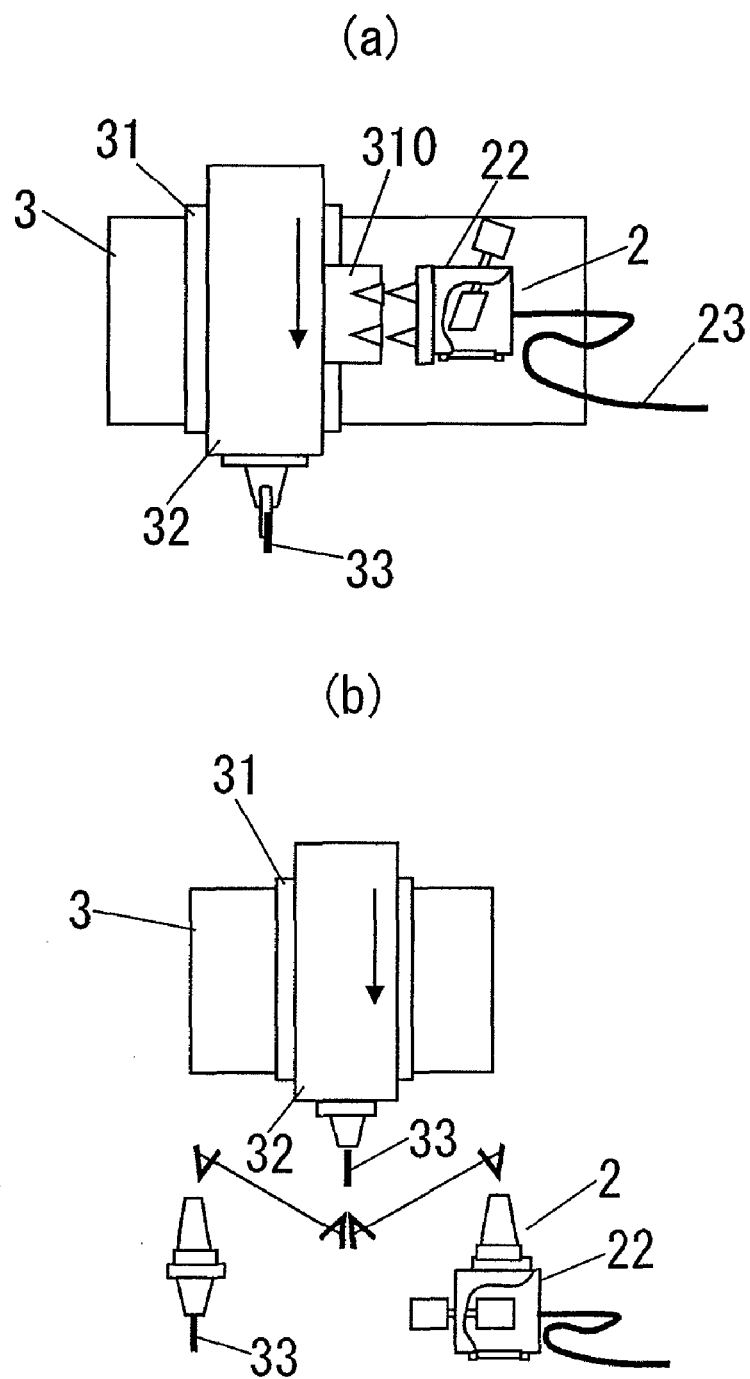
FIGS. 2(a) and (b) are schematic views respectively illustrating a manner of attaching an optical unit of the above embodiment.
Figure 3:
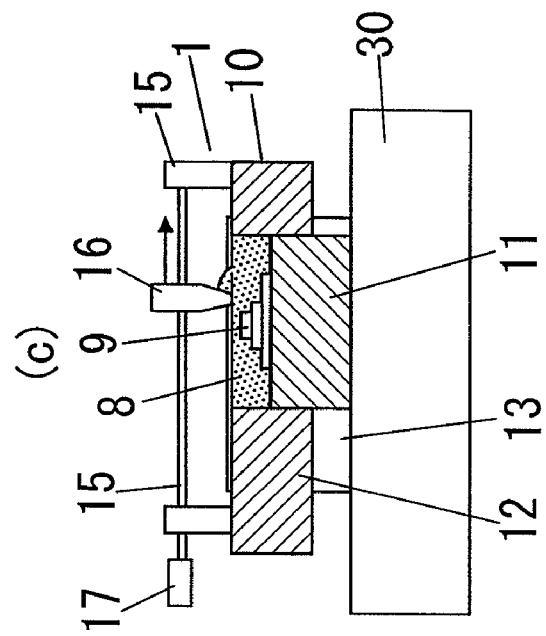
FIGS. 3(a), (b), and (c) are plan and schematic sectional views illustrating a powder supply section of the above embodiment.
Figure 3:
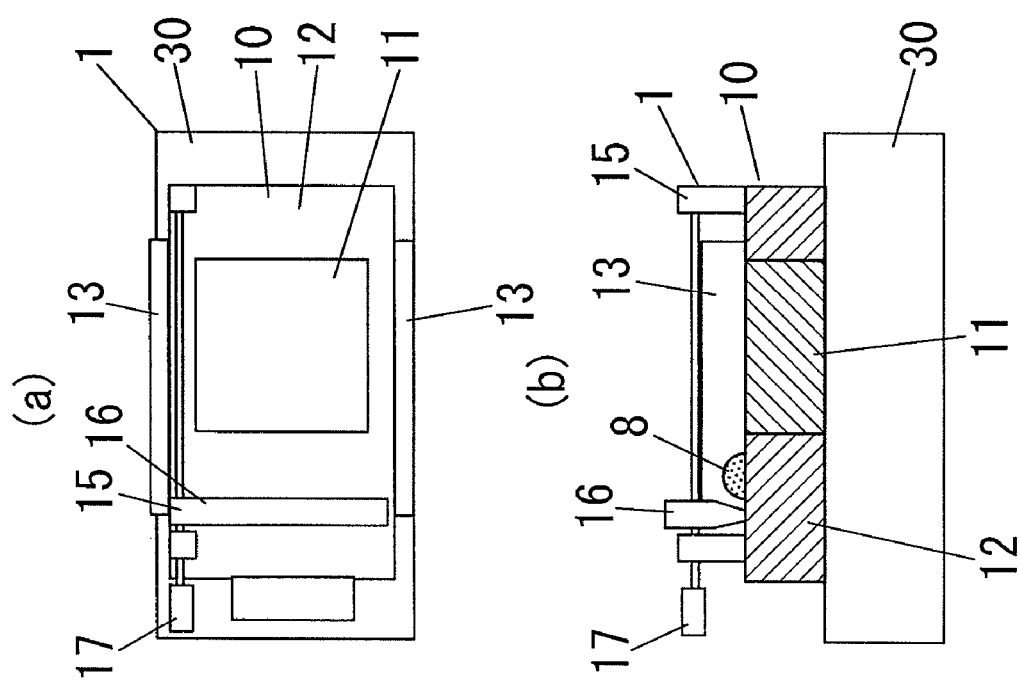

The scan mechanism 22 (optical unit 2) may be detachable to a mount 310 on the side of the spindle head 32 as shown in FIG. 2(a), or may be attached to the spindle head 32 by means of a collet chuck instead of the end-mill 33, as shown in FIG. 2(b). In the latter case, the spindle head 32 can be located at the same position irrespective of irradiating the light beam L or using the end-mill 33, thereby minimizing the overall travelling range of the spindle head 32 as compared to the case in which the optical unit 2 is disposed on the side of the headstock 31, therefore enabling to fabricate the object of relatively large volume. In addition, the absence of the optical unit 2 on the headstock 31 ensures to make grinding by use of the end-mill 32 free from being interfered with the optical fiber 23, and therefore with a reduced influence of vibrations.

When fabricating the lamination object with the above lamination shaping apparatus, the powder 8 is supplied onto the top of the elevator frame 12. While keeping the top of the elevator frame 12 a level slightly higher than a shaping plate fixed on the base 11, the blade 16 is driven to move horizontally to supply the powder 8 onto the base 11 and smoothen the same so as to form the first powder layer, followed by irradiating the light beam L from the optical unit 2 located above the shaping section 10 to a portion intended to be cured, thereby sintering the powder 8 to form the curd layer.

Subsequently, the elevator frame 12 is lifted by a predetermined extent so that the supply and the smoothing of the powder 8 are made to prepare the second powder layer on the first powder layer (and the cured layer). Then, the light beam L is irradiated to a portion intended to be cured of the second powder layer to cure the powder, forming the next cured layer integrated with the lower cured layer.

The steps of lifting the elevator frame 12 to prepare a fresh powder layer and irradiating the light beam L to the predetermined portion of the layer to form the cured layer are repeated to fabricate the three-dimensional object 9 of intended shape as a lamination object on the shaping plate on top of the base 11. The power layer is preferred to have a thickness of 0.05 mm when the resulting object is utilized as a molding die.

An irradiation path (hatching path) of the light beam L is prepared beforehand from a three-dimensional CAD data of the lamination object. That is, an STL (Standard Triangulation Language) data obtained from a three-dimensional CAD model is sliced at a constant pitch (0.05 mm pitch when the thickness of the powder layer is 0.05 mm) to give a sectional contour data of each section based on which the irradiation path is prepared. In this connection, the irradiation of the light beam L is made to sinter the outermost surface of the lamination object at a high density (below 5% of porosity) and sinter the interior at a low density. In other words, the sectional contour data is divided into a peripheral portion and an inside portion such that the irradiation of the light beam L is made to sinter the peripheral portion at a condition of melting the powder almost completely to give the high density, while sintering the inside portion at a condition of leaving a porous structure, whereby enabling fast manufacturing of the object with accurately contoured surface.

While the steps of preparing the powder layer and the forming of the cured layer by irradiation of the light beam L are repeated, the total thickness of the cured layers reaches to a predetermine value determined by a tool length or the like of the end-mill 33 of the milling unit 3. At this condition, the end-mill 33 is positioned above the shaping section 10 to grind the surface (chiefly the upper side face) of a precursor of the object 9 being made.

The grinding by use of the milling unit 3 removes a residual cured portion resulting from the powder adhered to the object 9, thus exposing the high density portion at the outermost surface of the object. Upon finishing of the grinding operation, the preparation of the powder layer and the sintering are repeated.

A grinding work path by the milling unit 3 is determined beforehand from the three-dimensional CAD data as in the case of the irradiation path of the light beam L. Although the contour line processing is applied to determine the grinding work path, there is no need to be in exact correspondence to the lamination pitch in the Z-direction (vertical direction) at the sintering, and the Z-direction pitch can be set to be shorter with the reducing inclination angle of the object for obtaining more smooth surface finish.

Figure 4:
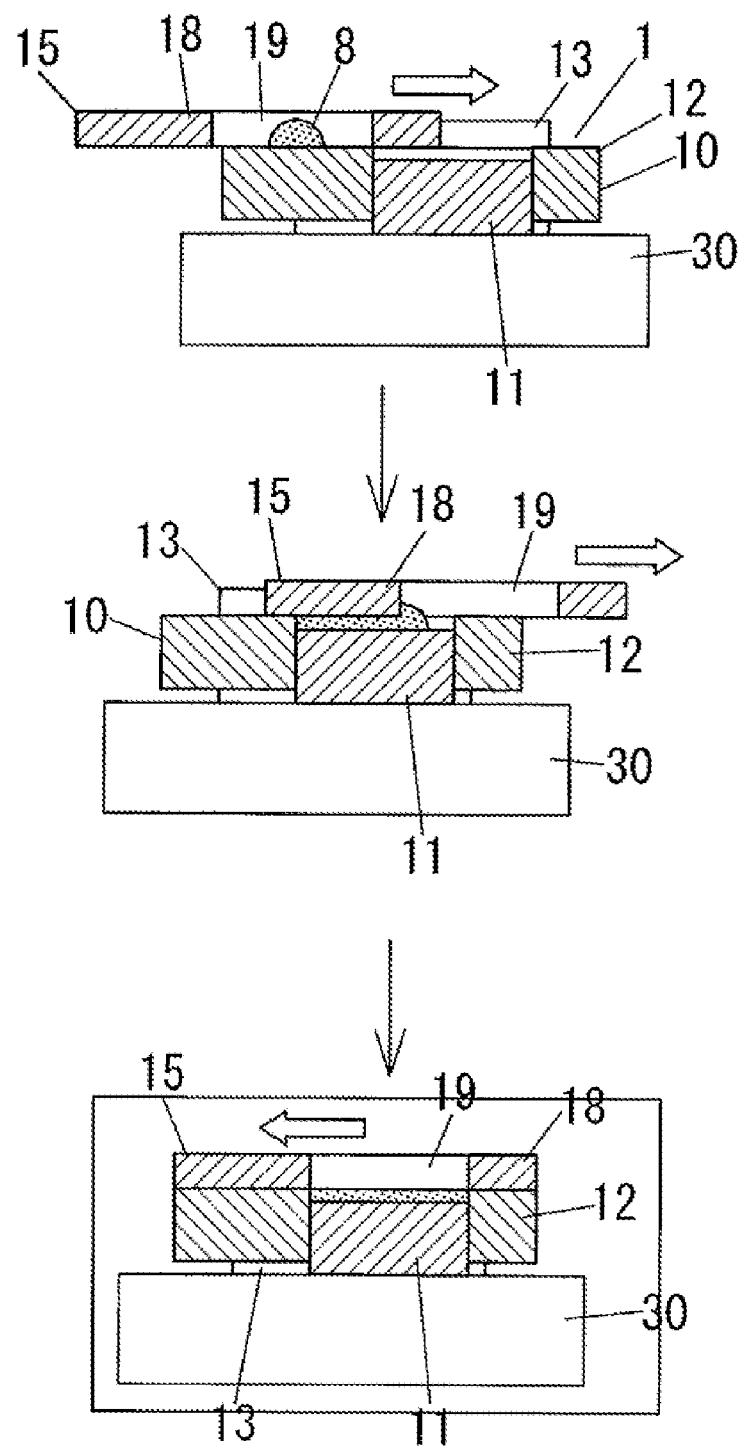
FIG. 4 is a schematic sectional view explaining a modification of the powder supply section utilized in the above embodiment.

FIG. 4 illustrates a modification of the power supply section 15 which is configured to have a slide plate 18 which is slidable on the top face of the elevator frame 12 and is provided with a vertically extending powder supply port 19. When the powder supply port 19 is in a position on the elevator frame 12 not above the base 11, the powder is fed from the powder supplier (not shown) into the powder supply port 19, after which the slide plate 18 is slid across the base 11 to supply the powder on the base and at the same time to smooth the powder. The sintering is made by irradiating the light beam L at a condition where the powder supply port 19 is positioned above the base 11 to direct the light beam through the powder supply port, or at a condition where the slide plate 18 is receded from above the base 11.

Figure 5:
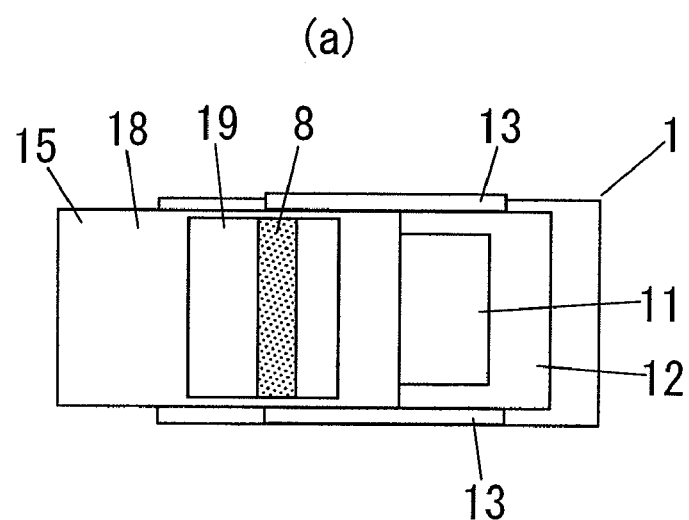
FIGS. 5(a), (b), (c) are respectively plan view of the above powder supply section, a schematic plan view of still another modification of the powder supply section, and a schematic plan view of a further modification of the powder supply section, respectively.
Figure 5:
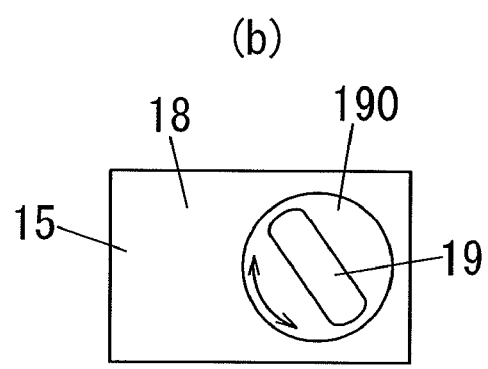
Figure 5:
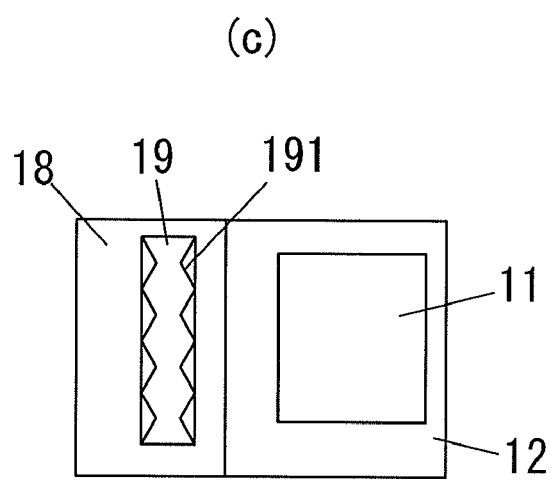
Figure 6:
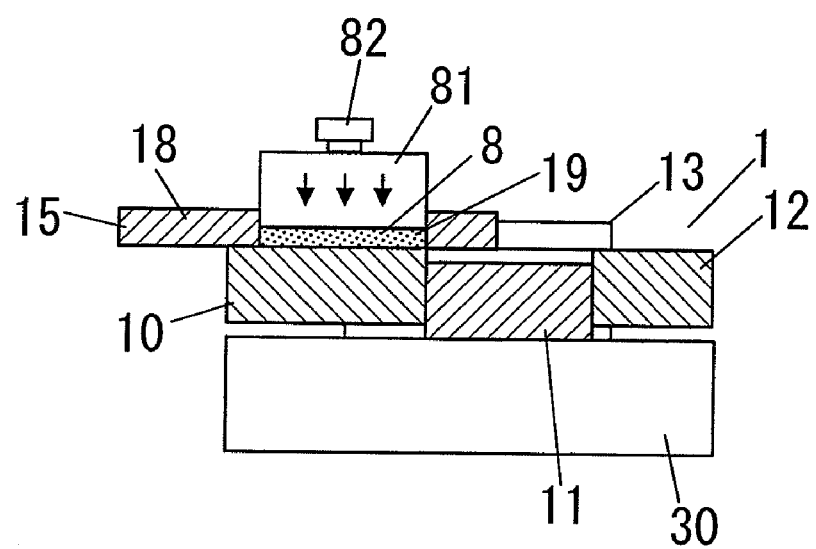
FIG. 6 is a schematic plan view of a still further modification of the powder supply section.

In this connection, the powder supply port 19 has a width (a dimension along a direction perpendicular to the sliding direction of the slide plate 18) which is greater than the corresponding width of the base 11, as shown in FIG. 5(a), to supply the powder evenly over the entire portion on the base 11. The powder supply port 19 is not necessarily square, and may be rectangular, circular, ellipsoid or any other shape to supply the powder 8 to the entire portion on the base 11.

Further, as shown in FIG. 5(b), the slide plate 18 may be provided in its interior with a rotary plate 190 which is rotatable about a vertical axis and is formed with a like powder supply port 19. In this modification, the rotation of the rotary plate 190 can vary the width of the powder supply port 19 with regard to the above direction.

As shown in FIG. 5(c), the inner wall of the powder supply port 19 is preferably finished with irregularities for effectively avoiding the powder 8 from aggregating on one width end within the powder supply port 19. Further, a collector may be formed either on the side of the slide plate 18 or the elevator frame 12 in order to avoid an occurrence in which residual powder would be hindrance to the sliding movement of the slide plate 18.

With the arrangement in which the sliding movement of the slide plate 18 having the powder supply port 19 is used for supplying the powder 8 into the shaping space confined by the elevator frame 12 on the base 11, it is possible to place a weight 81 on the powder within the powder supply port 19 for pressuring the same, and/or add a vibration generator 82 to vibrate the powder 8, thereby enhancing the bulk density of the powder 8 being supplied to the base 11 and therefore increasing the density of the powder layer for obtaining the object of high sintering density.

Figure 7:
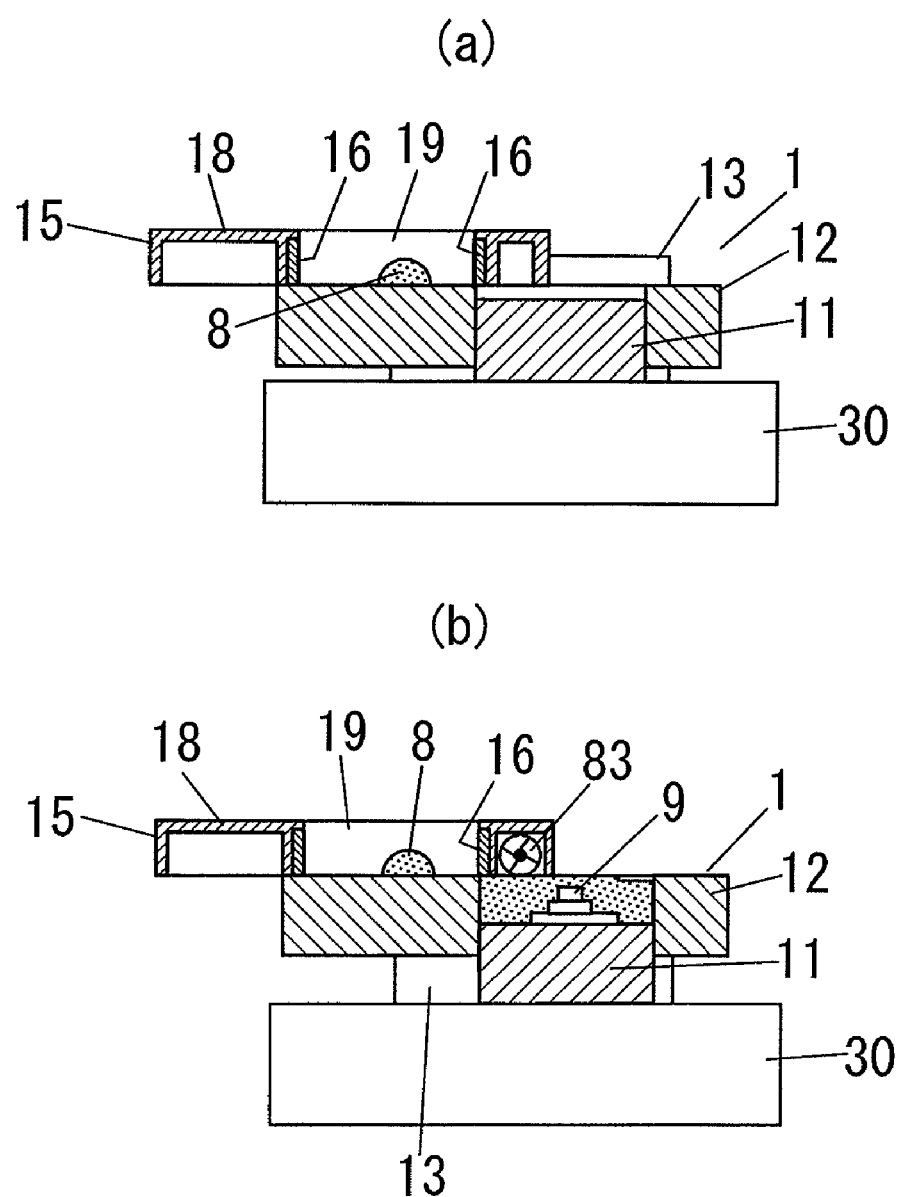
FIGS. 7(a) and (b) are schematic sectional views of more further modification of the powder supply section.

Although the slide plate 18 itself functions as a member of smoothening the powder layer on the base 11 in the above illustrated embodiment, a blade 16 for smoothing the powder 8 may be provided on both (or either one) of the opposite sides (or either one of the o) of the powder supply port 19 of the slide plate 18 with respect to its sliding direction, as shown in FIG. 7. This is advantageous particularly in case where the slide plate 18 is made of a light metal for lightweight purpose. The blade 16 is preferably made of steel or ceramics in consideration of that a hard projection possible resulting from abnormal sintering may be present on the surface of the powder being smoothed by the blade 16.

Further, in order to successfully remove the projection, the slide plate 18 may be provided with a rotary cutter 83 of which lower end is held in level with the lower surface of the slide plate 18 so as to cut away the projection by the rotary cutter 83. The rotary cutter 83 may be driven by a separately mounted motor or by a mechanism that uses the sliding movement of the slide plate 18 to rotate the rotary cutter 83, for instance, a rack-and-pinion mechanism.

Figure 8:
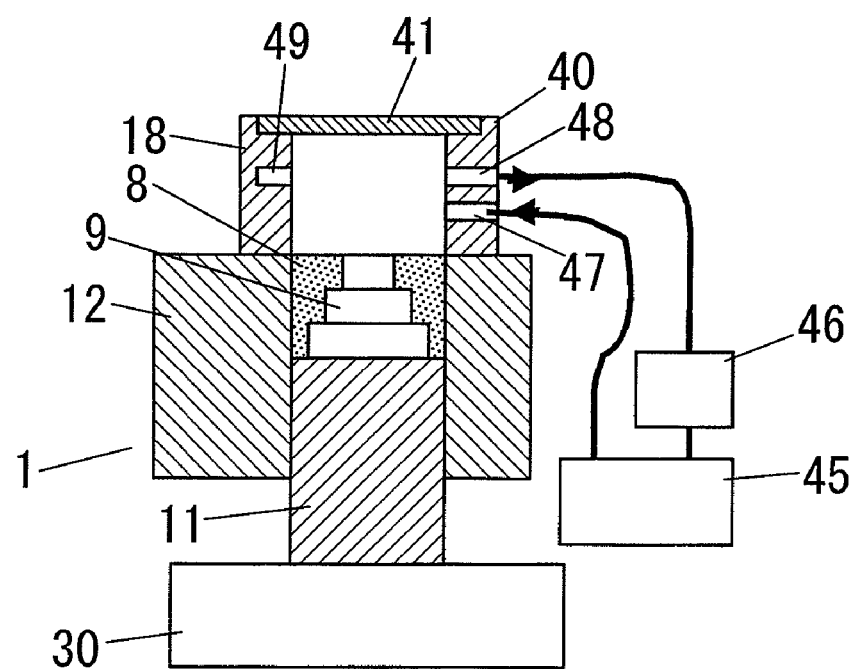
FIG. 8 is a schematic sectional view of a mask frame utilized to develop an inert atmosphere.

When irradiating the light beam L onto the powder layer for sintering with the powder being exposed to the atmosphere, oxidization may occur depending upon the kind of the powder material, failing to sinter the powder neatly. In order to avoid this insufficiency, the light beam L is irradiated within an inert atmosphere with the use of a mask frame 40 disposed on the elevator frame 12, as shown in FIG. 8. The mask frame 40 has a bottom opening which is larger than the upper surface area of the base 11 and has its top closed by a window 41 such that the light beam L is irradiated through the window 41 in a condition where an inert atmospheric gas (for instance, nitrogen or argon) is filled in the space surrounded by the mask frame 40. Numeral 45 designate an atmospheric gas generator or tank, 46 designates a dust collector for collecting fume generating at the sintering, 47 designates a gas charge port, and 48 designates a gas discharge port. Since the atmospheric gas is required to fill only the small space surrounded by the mask frame 40 on the base 11, it is possible to reduce the time for charging and discharging the atmospheric gas and the amount of the atmospheric gas.

For the purpose of reducing the amount of the atmospheric gas, it is possible to provide an oxygen meter 49 for measurement of oxygen concentration in the space of the mask frame 40 so as to supply the atmospheric gas only when the oxygen concentration becomes higher than a predetermined oxygen concentration.

For the purpose of enhancing transmissivity of the light beam L, the window 41 may be made of quartz glass when using the light beam L of YAG laser, and of zinc selenide when using the light beam L of $CO_2$ laser. When the window 41 is configured to function as a fθ lens rather than in the form of a parallel plate, the light beam L focus a spot of constant diameter on the sintering surface for precise sintering. Although a dynamic focusing lens may be utilized to give the spot of constant diameter, such lens is required to be mounted on the optical unit as an additional part, leading to a problem in an increased bulk and weight of the optical unit 2.

The mask frame 40 may be provided as a slide plate 18 slidable on the top face of the elevator frame 12 so as to be easily movable between a position at which the preparation of the powder layer and the grinding are made and a position at which the sintering is made by the light beam irradiation.

Figure 9:
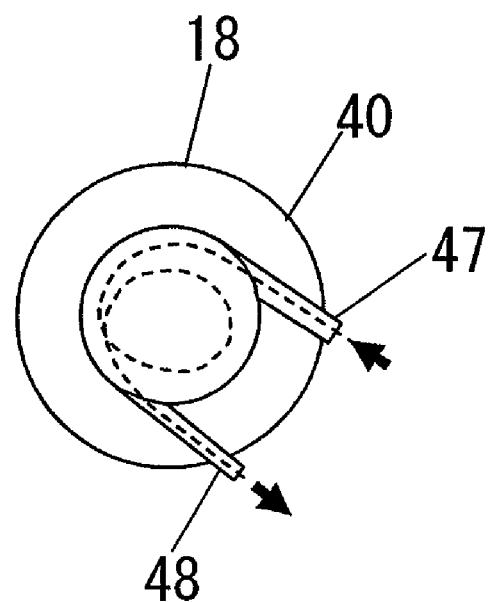
FIGS. 9(a) and (b) are a horizontal sectional view and a schematic sectional view of a modification of the mask frame.
Figure 9:
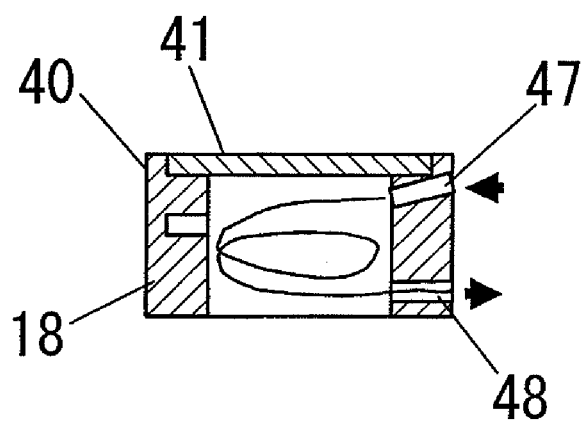

In view of the time required for charging and discharging of the atmospheric gas, ventilation efficiency of the gas, and anti-fouling requirement to the window 41, the gas charge port 47 and the gas discharge port 48 of the mask frame 40 are preferred to direct the atmospheric gas obliquely downwards to the interior space of the mask frame 40 along the inner periphery thereof, as shown in FIG. 9, so that the atmospheric gas is caused to flow in a swirling fashion downwards within the interior space.

Figure 10:
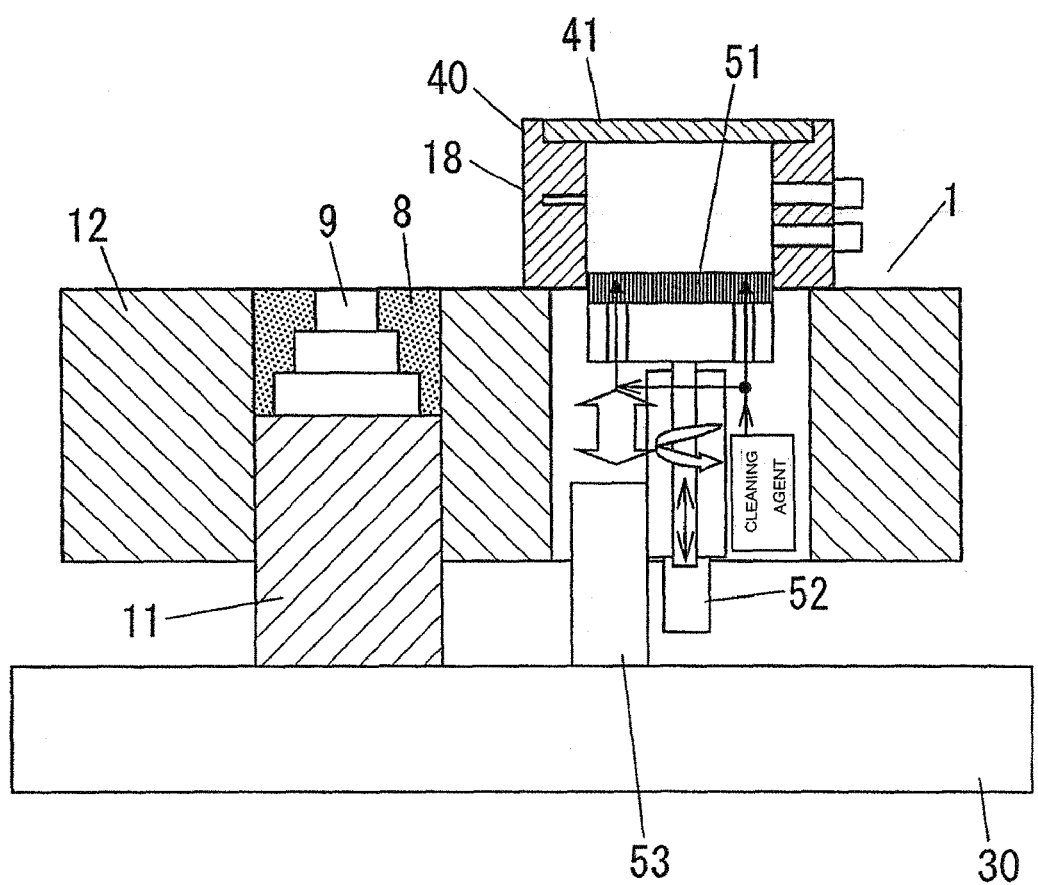
FIG. 10 is a schematic sectional view of a cleaning member.

To deal with a problem that the window 41 becomes smudged by the fume during the extended time of use and suffers from resultant lowering of transmissivity to the light beam L, the elevator frame 12 is preferred to incorporate a cleaning mechanism for cleaning the window 41. One example of the cleaning mechanism is shown in FIG. 10, in which a cleaning member 51 is disposed within an opening extending vertically through the elevator frame 12 and is driven by a vertical movement cylinder 53 to move up and down and is also driven by a motor to rotate. The cleaning member 51 is formed on its surface with a clearing paper or unwoven fabric and is provided with a spout for dispensing a cleaning agent (pressurized air, or water) so as to clean the interior surface of the window 41 and clean and wipe out the dirt on the interior wall of the mask frame 40. The vertical movement cylinder 53 is set on the table 53 such that the cleaning member 51 makes a vertical movement inclusive of that of the elevator frame 12.

Figure 11:
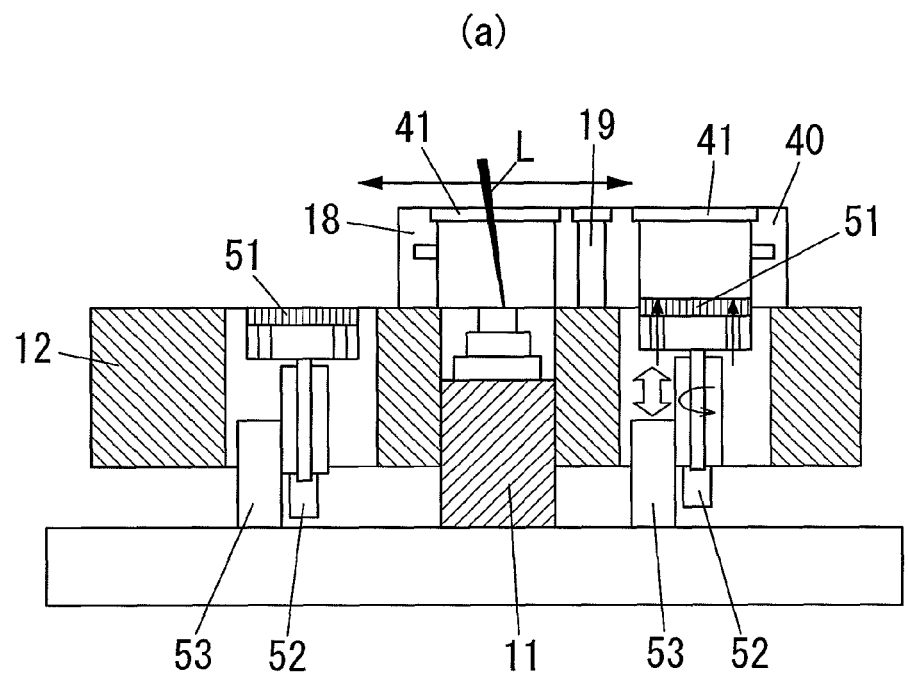
FIGS. 11(a) and (b) are schematic sectional views illustrating an instance of providing two sets of the cleaning members.
Figure 11:
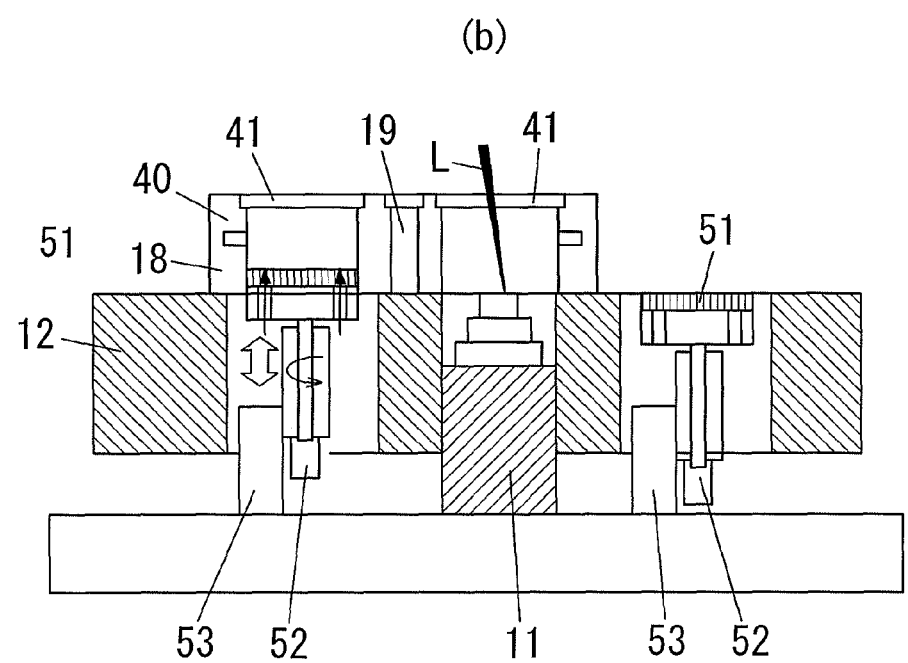

It is possible to use a plurality of the mask frames 40 forming the inert atmospheric environment, or to use the mask frame 40 having a plurality of windows 41, as shown in FIG. 11, such that one of the windows 41 is positioned above the cleaning mechanism when the other window 41 is located above the base 11. In this instance, the sintering and the cleaning are made simultaneously to eliminate a waiting time for the cleaning and therefore shorten the fabrication time of the lamination object.

The cleaning member 51 may be in the form of a piston which effects a forced charging and discharging of the atmospheric gas into and out of the mask frame 40. The cleaning member 51 discharges the atmospheric gas out of the interior space of the mask frame 40 when being lifted, and sucks the atmospheric gas into the interior space of the mask frame 40 when being lowered. In this connection, the gas charge port 47 and the gas discharge port 48 are each provided with a valve that is interlocked with the cleaning member (piston) 51 to open and close.

Figure 12:
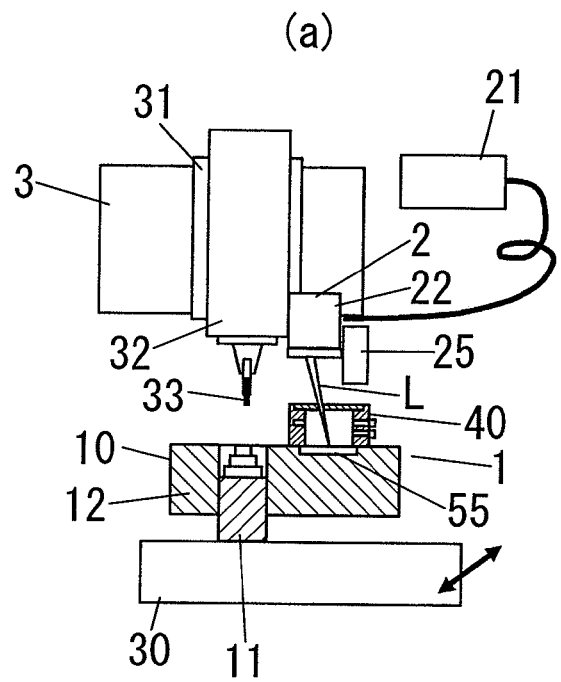
FIGS. 12(a) and (b) are schematic sectional views illustrating a configuration for positional compensation of an irradiation spot by the light beam.
Figure 12:
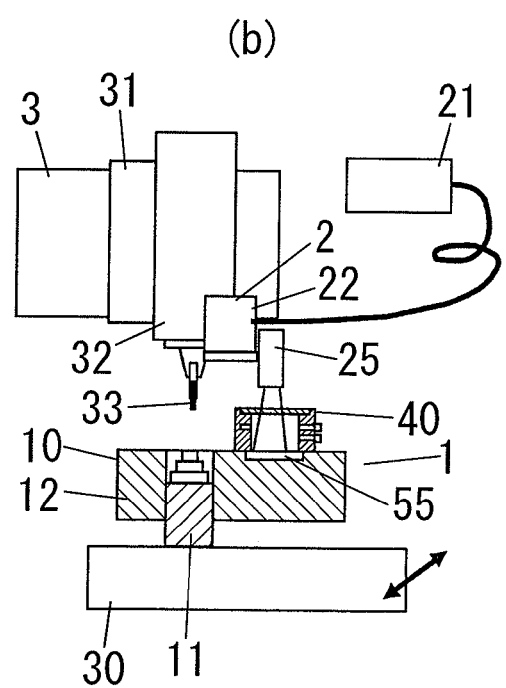
Figure 13:
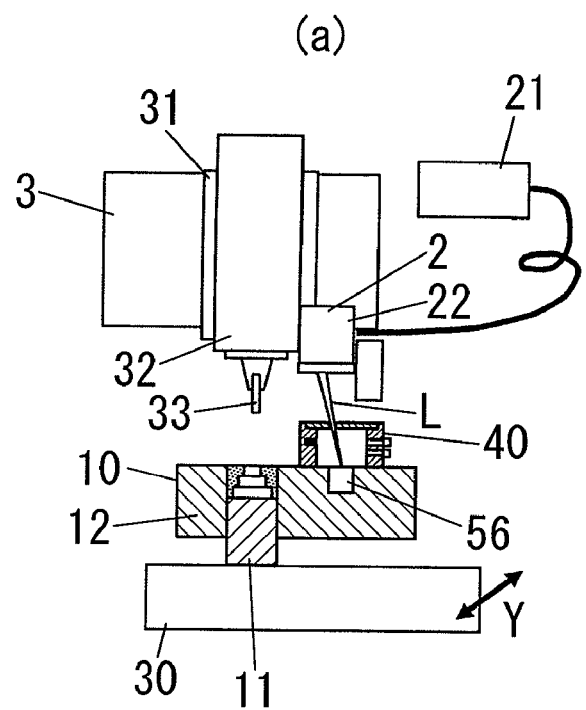
FIGS. 13(a) and (b) are schematic sectional views illustrating a configuration for measurement of a power of the light beam.
Figure 13:
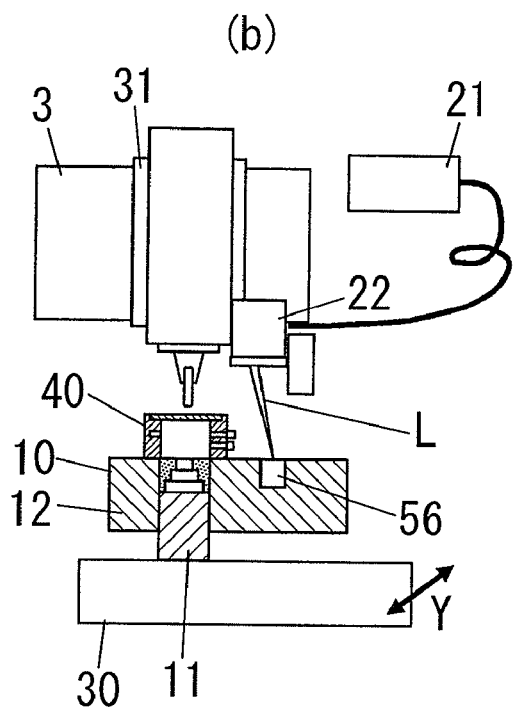

FIG. 12 illustrates an apparatus in which the elevator frame 12 is provided with a mark target 55 to which the light beam L is irradiated for marking, and an irradiation spot measuring unit 25 is provided for measurement of the spot of the marking on the mark target 55. The light beam L is irradiated to a predetermined spot (s) to give the marking of crossed lines or the like, as shown in FIG. 12($a$), then the irradiation spot measuring unit 25 (image element thereof) takes an image of the marking and makes an image processing to measure the position of the marking, as shown in FIG. 12($b$). Upon recognition of an error in the position of the marking, it is made to correct the rotation angle of the galvanometer mirror of the optical unit 2, thereby keeping to irradiate the light beam L to the spot at high accuracy. Especially, with the above arrangement, it is easy to correct the irradiation spot by the light beam L during the fabrication of the lamination object, which is advantageous for highly precise sintering, FIG. 13 illustrates an apparatus in which a power meter 56 is disposed on the elevator frame 12 for measuring a power of the light beam L. An attenuation factor of the light beam L indicative of the smudging extent of the window 41 is obtained from a difference between the outputs of the power meter 56 when receiving the light beam L through the window 41 of the mask frame and when receiving the light beam L directly with the mask frame 56 away from the power meter 56. Accordingly, a time of cleaning the window 41 can be easily and properly determined to enhance fabrication efficiency as well as to give constantly successful sintering.

Figure 14:
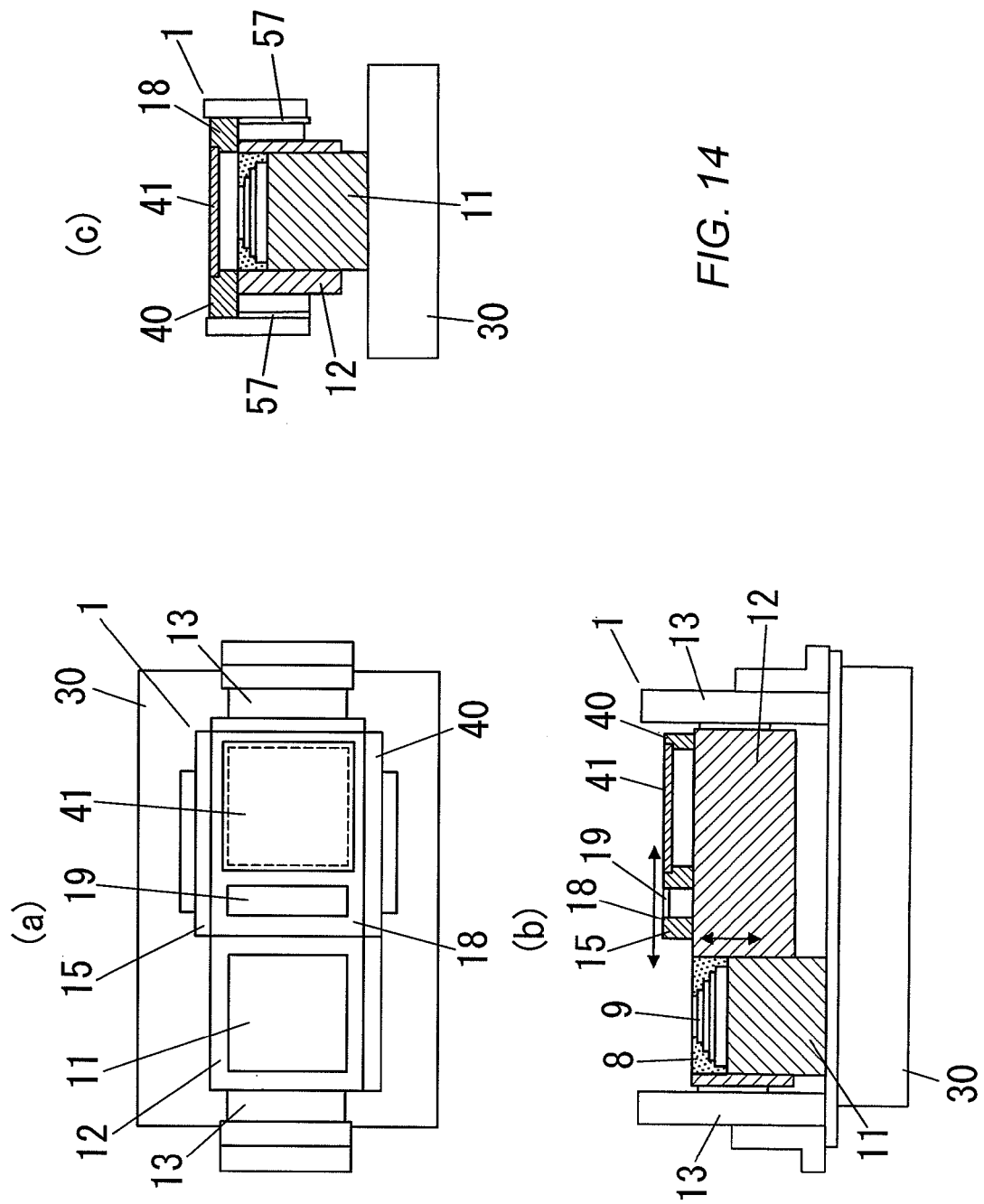
FIGS. 14(a), (b), and (c) are a plan view, schematic a vertical section, and a schematic horizontal section illustrating another embodiment of the present invention.

The mask frame 40 and the powder supply section 15 may be formed on the side of the single slide plate 18, as shown in FIG. 14. The slide plate 18, which is linearly slidable on the top face of the elevator frame 12, is provided at its lengthwise end with the powder supply port 19, and defines at its opposite lengthwise end the mask frame 40 with the window 41. The slide plate 18 is driven to slide on the top face of the elevator frame 12 by a linear driver such as a linear motor disposed on the side of the elevator frame 12.

The slide plate 18 is moved from the position as shown in FIG. 14 to a leftward position in FIG. 14 for preparing a fresh powder layer on the base 11 followed by the light beam L being irradiated through the window 41 to the powder layer for sintering. When grinding the object 9 by the milling unit 3, the slide plate 18 is caused to return to the illustrated position to expose the base 11.

Figure 15:
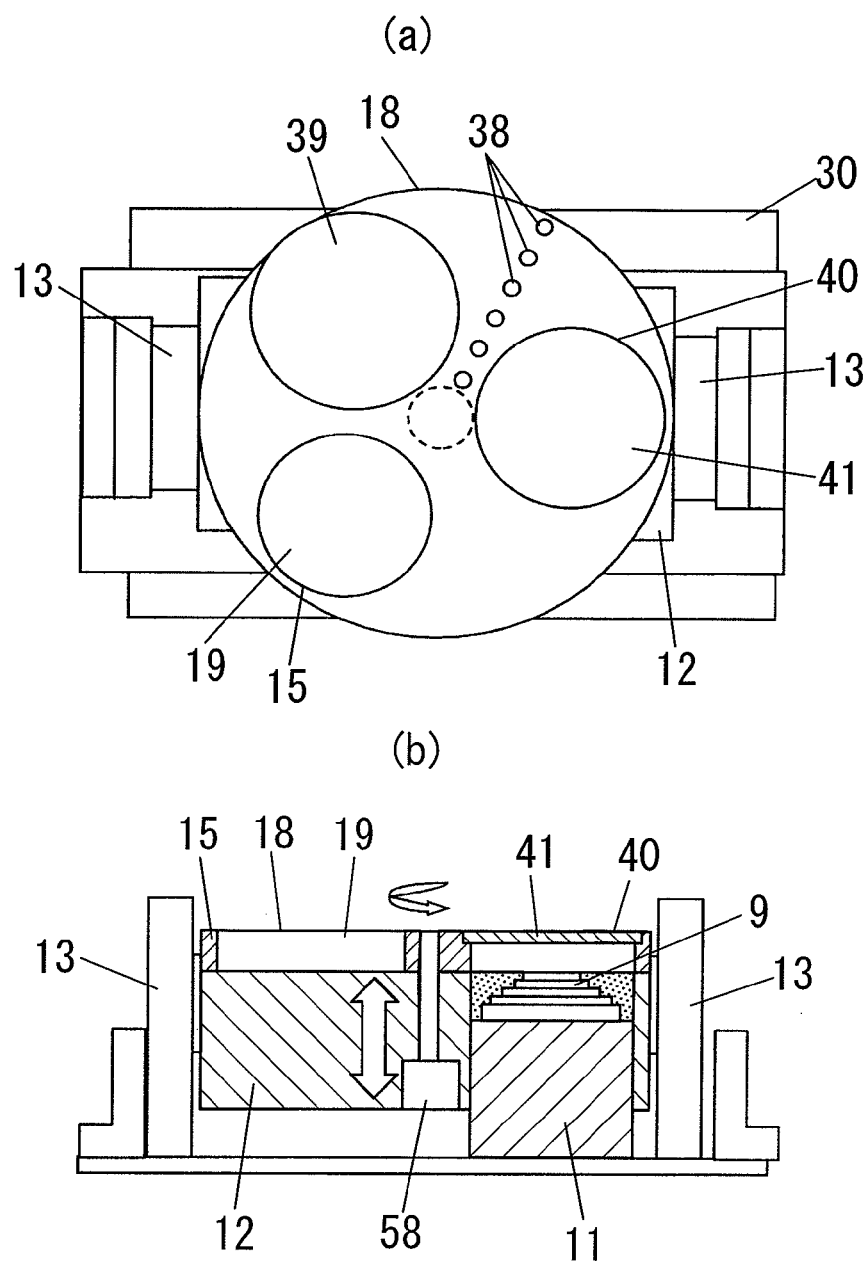
FIGS. 15(a) and (b) are a plan view, and a schematic vertical section illustrating a further embodiment.
Figure 16:
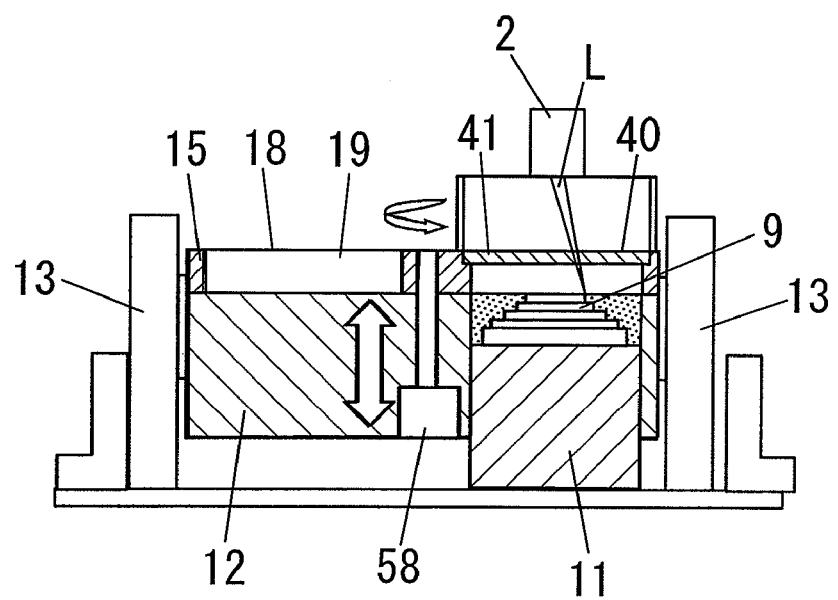
FIG. 16 is a schematic section illustrating another arrangement of disposing the optical unit.

FIG. 15 illustrates a modification in which the slide plate 18 is in the form of a disc which is driven by a motor 58 to rotate about its axis in a sliding relation with the top face of the elevator frame 12. The slide plate 18, which defines itself the power supply section 15 having the powder supply port 19 as well as the mask frame 40 having the window 41, is formed with a milling opening 39 that extends vertically for use during the grinding processing with the milling unit 3.

By rotating the slide plate 18, the powder supply section 15, the mask frame 40, and the milling opening 39 each formed in a peripheral portion of the slide plate 18 are successively and interchangeably positioned above the base 11. In the illustrated instance, a plurality of minute holes 38 are formed in the portion between mask frame 40 and the milling opening 39 for sucking the powder (or swarf occurred in the previous grinding), enabling to make the subsequent grinding without the presence of the uncured powder and therefore preventing the object being impaired by the uncured powder or avoiding the mixing of the swarf into the subsequently prepared powder layer.

Figure 17:
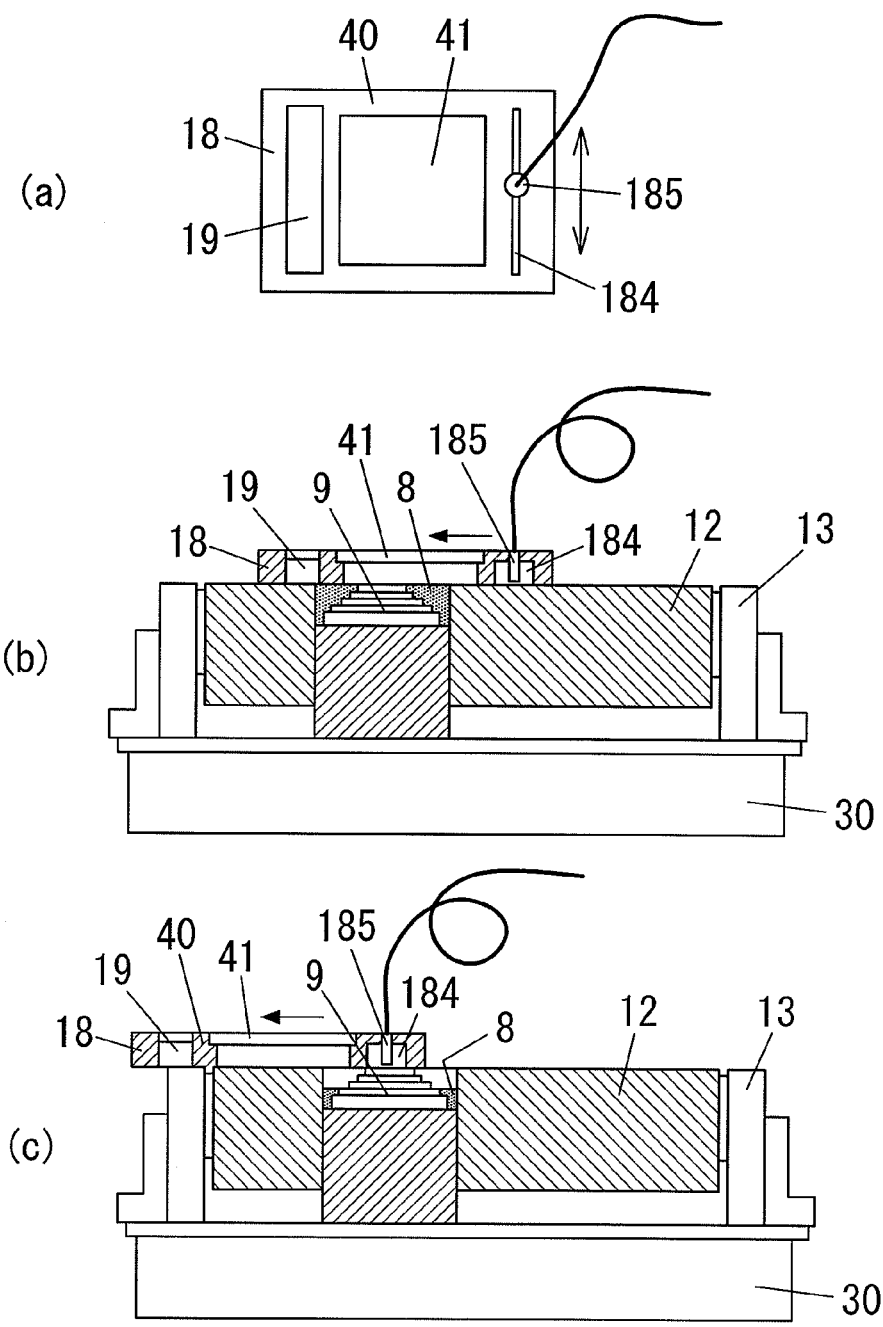
FIGS. 17(a), (b), and (c) are a horizontal section and schematic sections respectively of a slide plate equipped with a powder suction mechanism.

FIG. 17 illustrates a modification in which the slide plate 18 integrated with the mask frame 40 is formed with the powder supply port 19 and a powder sucking mechanism. The linearly slidable slide plate 18 is provided in its one end with respect to the sliding direction with the powder supply port 19, and is provided at the other end opposite of the mask frame 40 with a suction nozzle 185 for sucking the powder. The suction nozzle 185 is slidable along a slit 184 which is formed at the other end to extend in a direction perpendicular to the sliding direction, and is moved after the sintering of the powder 8 or the grinding to a position where the portion including the slit 184 is located above the base 11, as shown in FIG. 17(*c*) so that the suction nozzle 185 is driven to slide along the slit 184 for sucking the uncured powder or the swarf.

With the above sucking for the powder removable, it is possible to prepare the uniform powder layer free from being intermingled with spatters, and therefore obtain non-defective cured layer. When utilizing the step of removing powder, the powder supply section 15 gives a more amount of the powder at the subsequent step of supplying the powder to form the powder layer.

When the slide plate 18 is integrated with the powder supply section 15, the mask frame 40, and the milling opening 39, and the shapine unit 1 includes fixed plural bases (not shown), the plural bases could be combined with the single elevator frame 12 such that the powder is supplied to one of the bases while the sintering or grinding is made on the other base, or the sintering is made on one of the bases while the grinding is made on the other base, which facilitates to fabricate the plural objects simultaneously and efficiently.

When using the rotating slide plate 18, the slide plate can afford a plurality of the powder supply sections 15, mask frames 40 and/or milling openings 39 in the peripheral area so as to be made into a compact structure, or can be easily adapted for the above combination of the plural bases and the single elevator frame 12.

Although the optical unit 2 is disposed on the side of the milling unit 3 in the above illustrated embodiment and modifications, the optical unit 2 may be disposed on the side of the mask frame 40 (slide plate 18), as shown in FIG. 7.

Figure 18:
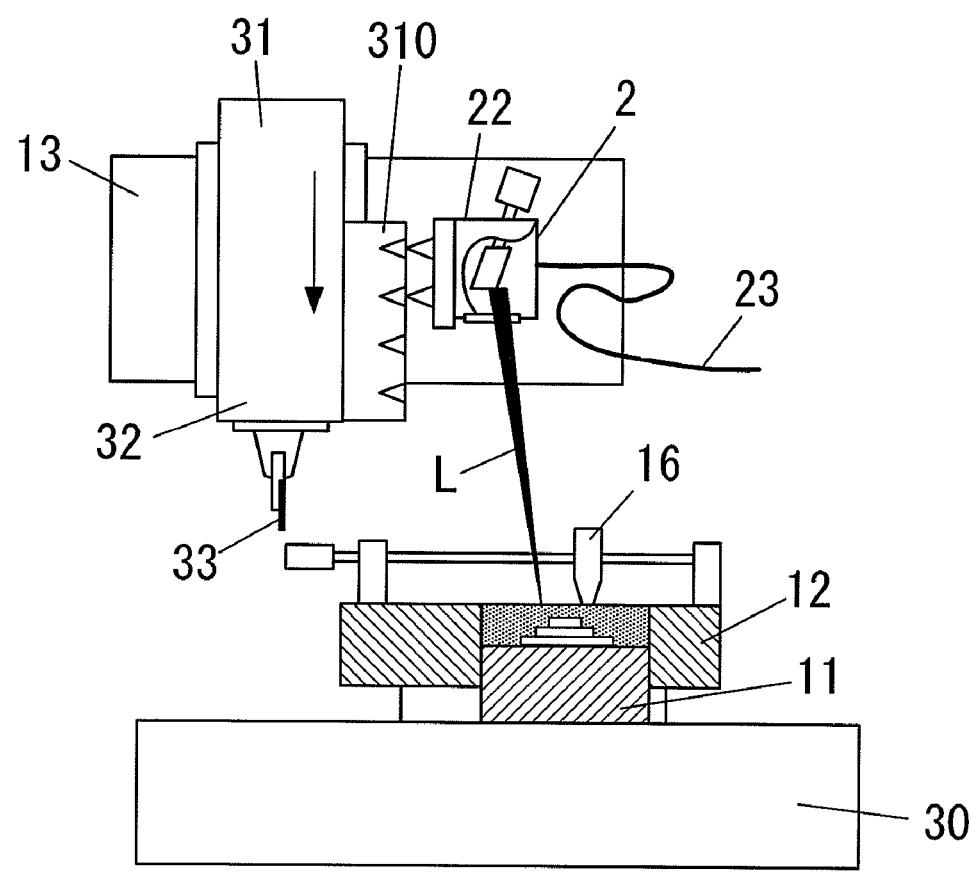
FIG. 18 is a schematic section illustrating a modification in which the optical unit is made removable.

Further, when the optical unit 2 is detachable to the headstock 31 of the milling unit 3, a mount 31 detachably mounting the optical unit 2 is preferred to have a capability of changing the mounting position of the optical unit 2 along the vertical direction, as shown in FIG. 18.

As the mounting level of the optical unit 2 is higher, the longer the distance to the working surface so that the same scan angle of the scan mechanism 22 results in a longer scan path than in the shorter distance to the working surface with a resulting increased scanning rate. However, an error in the scan angle would result in an increased positional error on the working surface.

Accordingly, when the rapid scanning is required to cover a wide range for the lamination object not requiring high precision, the optical unit 2 can be mounted at a relatively high level to assure rapid formation of the cured layer, while the optical unit 2 can be mounted at a relatively low level when the high precision scanning is required.

Further, it is possible to select the low mounting level when the optical unit 2 irradiates the light beam L to the outermost part of the object, and select the high mounting level when the optical unit 2 irradiates the light beam L to the interior part of the same object.

Figure 19:
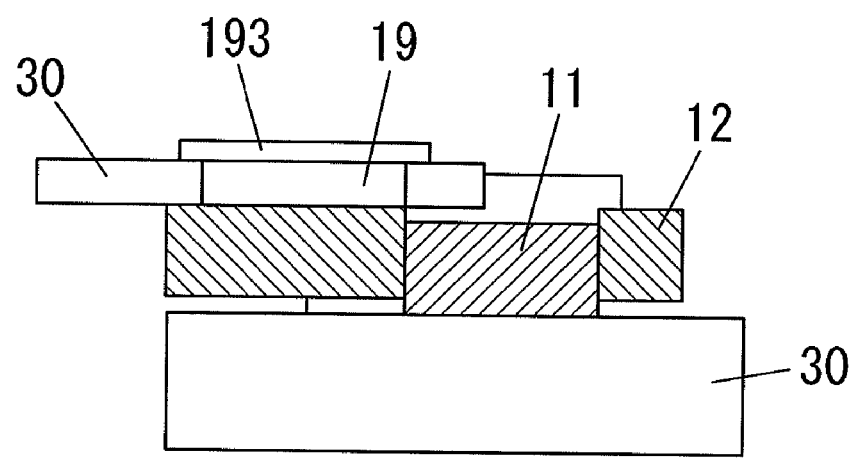
FIG. 19 is a schematic section illustrating a modification in which the powder supply port is provided with a cover.

FIG. 19 illustrates a modification in which a cover 193 is provided to close the upper opening of the powder supply port 19 in the slide plate 18. The cover 193 is included to keep the powder 8 free from dirt or dust, the spatters developing at the sintering, or the swarf developing at the grinding.

Figure 20:
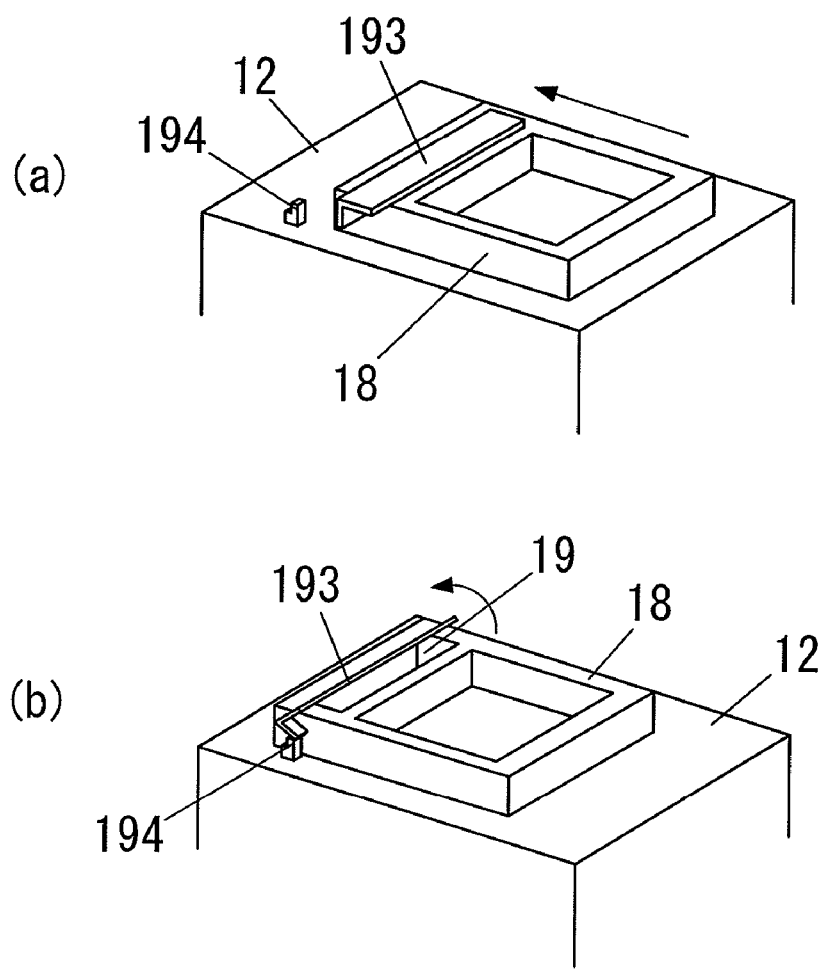
FIGS. 20(a) and (b) are perspective views illustrating another modification in which the powder supply port is provided with a cover.

Preferably, the cover 193 is configured to open and close in synchronous with the sliding movement of the slide plate 18. The rotatably supported cover 193 shown in FIG. 20 is caused to rotate when abutting against a stopper 194, and open the upper opening of the powder supply port 19.

Figure 21:
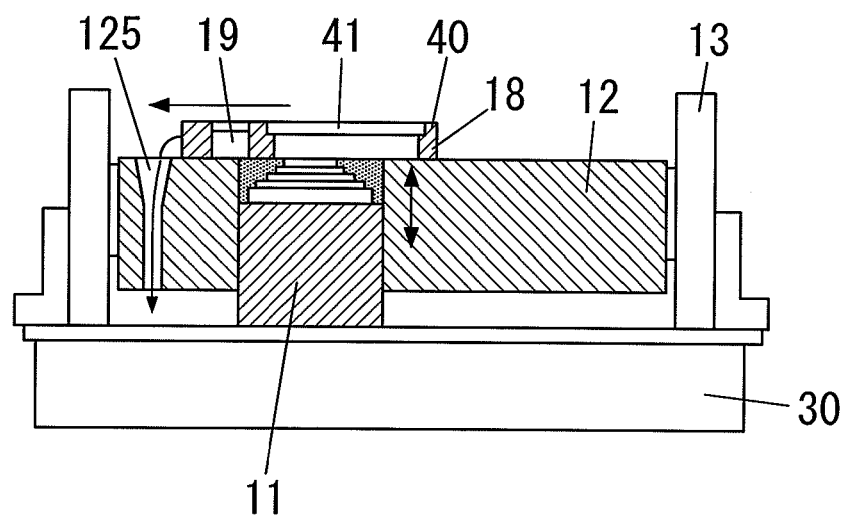
FIG. 21 is a schematic section illustrating a modification in which the elevator frame is provided with a discharge port.
Figure 22:
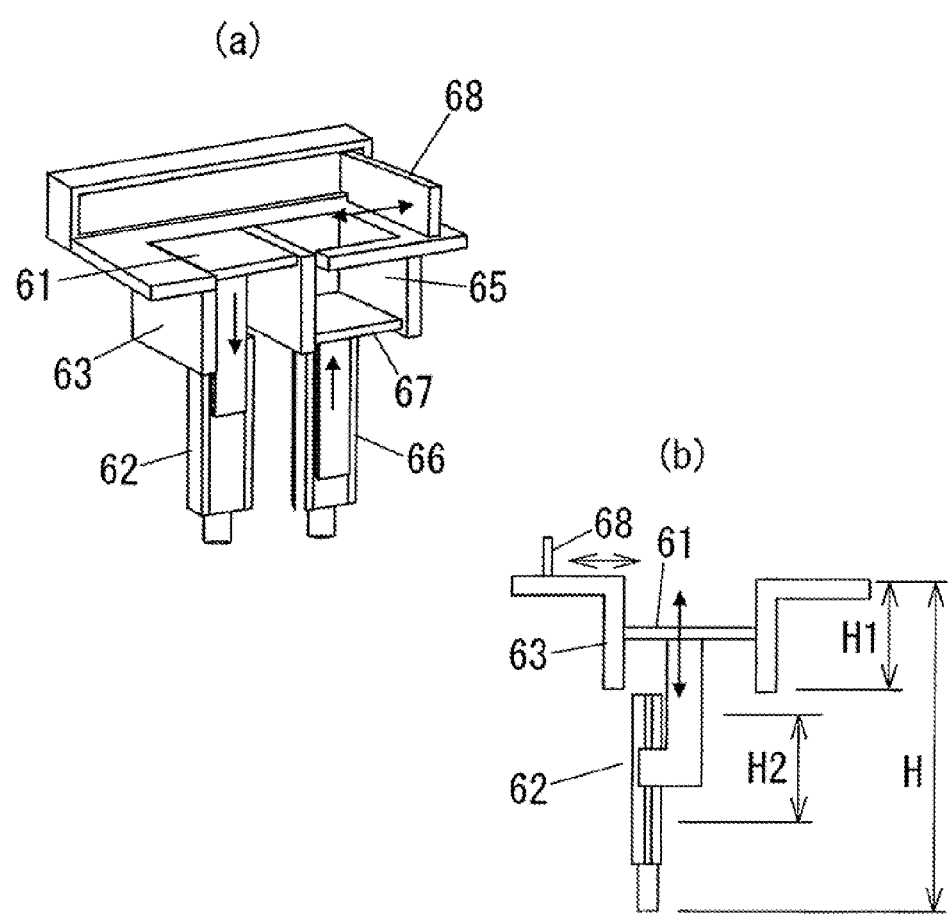
FIGS. 22(a) and (b) are partly cut-away perspective view and a partial sectional view illustrating a prior art.

FIG. 21 illustrates a modification in which the elevator frame 12 is provided with a discharge port 125 for discharging residual powder 8 remaining on the top face of the elevator frame 12. Only a minimum clearance is left between the elevator frame 12 and the slide plate 18 such that the powder, the swarf, or the spatters accumulating on the base 11 to rise above the top face of the elevator frame 12 are squeezed towards the periphery of the top end of the elevator frame 12 as the slide plate 18 slides.

The discharge port 125 acts to discharge the powder and the swarf without interfering with the sliding movement of the slide plate 18. The discharged powder 8 can be collected through a sieve for re-use.

The invention claimed is:

1. A lamination shaping apparatus comprising:
   a powder layer preparing means configured to prepare a powder layer of inorganic or organic powder material; and
   an optical unit configured to irradiate a light beam to an intended portion of said powder layer in order to sinter or melt for solidifying the portion into a cured layer such that the preparation of said powder layer and the forming of said cured layer are repeated to fabricate a three-dimensional object in which a plurality of said cured layers are laminated and integrated;
   wherein said apparatus includes a fixed base carrying thereon said powder layer and said cured layer;
   an elevator frame configured to surround a periphery of said fixed base and to be vertically movable relative to said fixed base, thereby defining thereabove a space which is surrounded by an interior surface of said elevator frame to prepare said powder layer; and
   an elevator driving means which drives said elevator frame to move vertically,
   wherein said powder layer preparing means includes a slide plate which is slidable on a top face of said elevator frame and has a powder supply port for feeding said powder into said space formed on said base and surrounded by said elevator frame.

2. A lamination shaping apparatus as set forth in claim 1, wherein said apparatus further comprises:
   a milling unit provided to grind a surface of a precursor of said three-dimensional object being fabricated,
   wherein said milling unit is in the form of a numerical control machine having a table which is controllable at least with respect to three axes and is fixed to said base.

3. A lamination shaping apparatus as set forth in claim 1, wherein
   said powder supply port is dimensioned to have a width which is perpendicular to a sliding direction of said slide plate, the width of said powder supply port being greater than a corresponding width of said base.

4. A lamination shaping apparatus as set forth in claim 1, wherein
   said slide plate is provided with a member for enhancing a bulk density of said powder.

5. A lamination shaping apparatus as set forth in claim 1, wherein
   said slide plate is provided with a member for smoothening the surface of said powder layer.

6. A lamination shaping apparatus as set forth in claim 1, further including:
a mask frame which is disposed on said elevator frame to have an open bottom and a window in its top opening for passing therethrough said light beam; and
an atmospheric gas supplying means for supplying an atmospheric gas within said mask frame.

7. A lamination shaping apparatus as set forth in claim 6, wherein
said mask frame is provided with a whirl flow forming means for supplying said atmospheric gas in the form of a whirl flow into within said mask frame.

8. A lamination shaping apparatus as set forth in claim 6, further including:
an oxygen concentration meter for measuring an oxygen concentration within an interior space of said mask frame,
said atmospheric gas supplying means being configured to supply said atmospheric gas according to an output of said oxygen concentration meter.

9. A lamination shaping apparatus as set forth in claim 6, further including:
a piston configured to move vertically within said mask frame for supplying and discharging the atmospheric gas.

10. A lamination shaping apparatus as set forth in claim 6, wherein
said window is in the form of a f·θ lens.

11. A lamination shaping apparatus as set forth in claim 6, further including
a cleaning means configured to clean the interior surface of said mask frame including the interior surface of said window.

12. A lamination shaping apparatus as set forth in claim 11, wherein
said cleaning means comprises a cleaning member which is formed on said elevator frame to be vertically movable and rotatable within the mask frame for clearing the interior surface of said mask frame including the interior surface of said window.

13. A lamination shaping apparatus as set forth in claim 11, wherein
a plurality of said mask frames are provided to be slidable on the top face of said elevator frame such that when one of said mask frames is positioned on said base, the other mask frame comes into a position where it is cleaned by said cleaning means.

14. A lamination shaping apparatus as set forth in claim 6, wherein
said optical unit is disposed on the side of said mask frame.

15. A lamination shaping apparatus as set forth in claim 1, further including:
a mark target provided on the top face of said elevator frame for providing a marking thereon by the light beam from said optical unit, and
a measuring unit configured to measure said marking on said mark target to obtain a compensation data with regard to an irradiation spot intended by the light beam from said optical unit.

16. A lamination shaping apparatus as set forth in claim 1, further including:
a power meter disposed on the top face of said elevation frame and configured to measure a power of the light beam from said optical unit.

17. A lamination shaping apparatus as set forth in claim 1, further including:
a mask frame being disposed on said elevator frame, having an open bottom, and having in its top opening with a window for passing therethrough said light beam; and
an atmospheric gas supplying means for supplying an atmospheric gas within said mask frame,
said mask frame being formed as a portion of said slide plate.

18. A lamination shaping apparatus as set forth in claim 2, wherein
said apparatus includes fixed plural bases carrying thereon said powder layer and said cured layer,
said elevation frame being configured to surround an outer periphery of each of said plural bases and be vertically movable relative to each said base,
said powder layer preparing means preparing said powder layer on or above the plural bases selectively by the sliding movement of said slide plate.

19. A lamination shaping apparatus as set forth in claim 18, wherein
said slide plate is formed with a milling opening for passing therethrough a tool of said milling unit.

20. A lamination shaping apparatus as set forth in claim 17, wherein
said slide plate is provided with a suction unit which sucks uncured powder on said base for removal.

21. A lamination shaping apparatus as set forth in claim 17, wherein
said slide plate is configured to rotate in a sliding relation with the top face of said elevation frame.

22. A lamination shaping apparatus as set forth in claim 18, wherein
said slide plate is provided with a suction unit which sucks uncured powder on said base for removal.

23. A lamination shaping apparatus as set forth in claim 18, wherein
said slide plate is configured to rotate in a sliding relation with the top face of said elevation frame.

24. A lamination shaping apparatus comprising:
a powder layer preparing means configured to prepare a powder layer of inorganic or organic powder material; and
an optical unit configured to irradiate a light beam to an intended portion of said powder layer in order to sinter or melt for solidifying the portion into a cured layer such that the preparation of said powder layer and the forming of said cured layer are repeated to fabricate a three-dimensional object in which a plurality of said cured layers are laminated and integrated;
wherein said apparatus includes a fixed base carrying thereon said powder layer and said cured layer;
an elevator frame configured to surround a periphery of said fixed base and to be vertically movable relative to said fixed base, thereby defining thereabove a space which is surrounded by an interior surface of said elevator frame to prepare said powder layer; and
an elevator driving means which drives said elevator frame to move vertically,
wherein said optical unit comprises a scan mechanism for deflecting the light beam to direct it to the intended portion,
wherein said scan mechanism is disposed to have a variable height position relative to a plane irradiated by the light beam, and
wherein said powder layer preparing means includes a slide plate which is slidable on a top face of said elevator frame and has a powder supply port for feeding said powder into said space formed on said base and surrounded by said elevator frame.

25. A lamination shaping apparatus as set forth in claim 24, wherein said apparatus comprises:
a milling unit provided to grind a surface of a precursor of said three-dimensional object being fabricated,
wherein said milling unit is in the form of a numerical control machine having a table which is controllable at least with respect to three axes and is fixed to said base.

26. A lamination shaping apparatus as set forth in claim 24, wherein
said powder supply port is dimensioned to have a width which is perpendicular to a sliding direction of said slide plate, the width of said powder supply port being greater than a corresponding width of said base.

27. A lamination shaping apparatus as set forth in claim 24, wherein
said slide plate is provided with a member for enhancing a bulk density of said powder.

28. A lamination shaping apparatus as set forth in claim 24, wherein
said slide plate is provided with a member for smoothening the surface of said powder layer.

29. A lamination shaping apparatus as set forth in claim 24, further including:
a mask frame which is disposed on said elevator frame to have an open bottom and a window in its top opening for passing therethrough said light beam; and
an atmospheric gas supplying means for supplying an atmospheric gas within said mask frame.

30. A lamination shaping apparatus as set forth in claim 29, wherein
said mask frame is provided with a whirl flow forming means for supplying said atmospheric gas in the form of a whirl flow into within said mask frame.

31. A lamination shaping apparatus as set forth in claim 29, further including:
an oxygen concentration meter for measuring an oxygen concentration within an interior space of said mask frame,
said atmospheric gas supplying means being configured to supply said atmospheric gas according to an output of said oxygen concentration meter.

32. A lamination shaping apparatus as set forth in claim 29, further including:
a piston configured to move vertically within said mask frame for supplying and discharging the atmospheric gas.

33. A lamination shaping apparatus as set forth in claim 29, wherein
said window is in the form of a f·θ lens.

34. A lamination shaping apparatus as set forth in claim 29, further including:
a cleaning means configured to clean the interior surface of said mask frame including the interior surface of said window.

35. A lamination shaping apparatus as set forth in claim 34, wherein
said cleaning means comprises a cleaning member which is formed on said elevator frame to be vertically movable and rotatable within the mask frame for clearing the interior surface of said mask frame including the interior surface of said window.

36. A lamination shaping apparatus as set forth in claim 34, wherein
a plurality of said mask frames are provided to be slidable on the top face of said elevator frame such that when one of said mask frames is positioned on said base, the other mask frame comes into a position where it is cleaned by said cleaning means.

37. A lamination shaping apparatus as set forth in claim 29, wherein
said optical unit is disposed on the side of said mask frame.

38. A lamination shaping apparatus as set forth in claim 24, further including:
a mark target provided on the top face of said elevator frame for providing a marking thereon by the light beam from said optical unit, and
a measuring unit configured to measure said marking on said mark target to obtain a compensation data with regard to an irradiation spot intended by the light beam from said optical unit.

39. A lamination shaping apparatus as set forth in claim 24, further including:
a power meter disposed on the top face of said elevation frame and configured to measure a power of the light beam from said optical unit.

40. A lamination shaping apparatus as set forth in claim 24, further including:
a mask frame being disposed on said elevator frame, having an open bottom, and having in its top opening with a window for passing therethrough said light beam;
an atmospheric gas supplying means for supplying an atmospheric gas within said mask frame; and
said mask frame being formed as a portion of said slide plate.

41. A lamination shaping apparatus as set forth in claim 25, wherein
said apparatus includes fixed plural bases carrying thereon said powder layer and said cured layer,
said elevation frame being configured to surround an outer periphery of each of said plural bases and be vertically movable relative to each said base,
said powder layer preparing means being provided on said slide plate to prepare said powder layer on or above the plural bases selectively by the sliding movement of said slide plate.

42. A lamination shaping apparatus as set forth in claim 41, wherein
said slide plate is formed with a milling opening for passing therethrough a tool of said milling unit.

43. A lamination shaping apparatus as set forth in claim 40, wherein
said slide plate is provided with a suction unit which sucks uncured powder on said base for removal.

44. A lamination shaping apparatus as set forth in claim 40, wherein
said slide plate is configured to rotate in a sliding relation with the top face of said elevation frame.

45. A lamination shaping apparatus as set forth in claim 41, wherein
said slide plate is provided with a suction unit which sucks uncured powder on said base for removal.

46. A lamination shaping apparatus as set forth in claim 41, wherein
said slide plate is configured to rotate in a sliding relation with the top face of said elevation frame.

* * * * *